(12) United States Patent
Rosenbaum et al.

(10) Patent No.: US 11,693,804 B2
(45) Date of Patent: Jul. 4, 2023

(54) CROSS BUS MEMORY MAPPING

(71) Applicant: MELLANOX TECHNOLOGIES, LTD., Yokneam (IL)

(72) Inventors: Alex Rosenbaum, Elishama (IL); Oren Duer, Kohav Yair (IL); Alexander Mikheev, Hadera (IL); Nitzan Carmi, Ramat-Gan (IL); Haggai Eran, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 72 days.

(21) Appl. No.: 17/338,131

(22) Filed: Jun. 3, 2021

(65) Prior Publication Data

US 2022/0391341 A1    Dec. 8, 2022

(51) Int. Cl.
*G06F 13/00* (2006.01)
*G06F 13/40* (2006.01)
*G06F 15/173* (2006.01)
*G06F 13/16* (2006.01)
*G06F 13/42* (2006.01)

(52) U.S. Cl.
CPC ...... *G06F 13/4022* (2013.01); *G06F 13/1673* (2013.01); *G06F 13/4221* (2013.01); *G06F 15/17331* (2013.01)

(58) Field of Classification Search
CPC ............. G06F 13/4022; G06F 13/1673; G06F 13/4221; G06F 15/17331
See application file for complete search history.

(56) References Cited

U.S. PATENT DOCUMENTS

| 9,397,960 | B2 | 7/2016 | Arad et al. |
| 10,162,793 | B1 * | 12/2018 | Bshara ..................... H04L 69/16 |
| 2008/0123672 | A1 | 5/2008 | Wilkinson |
| 2015/0058557 | A1 * | 2/2015 | Madhusudana ....... G06F 3/0655 |
| | | | 711/114 |
| 2018/0213669 | A1 * | 7/2018 | Kochukunju ........ H05K 7/1488 |

OTHER PUBLICATIONS

"In-Hardware Storage Virtualization—NVMe SNAP™ Revolutionizes Data Center Storage Composable Storage Made Simple," Mellanox Technologies, 2019, 60296SB, Rev. 1.1, 3 pages [retrieved online from: mellanox.com/files/doc-2020/sb-mellanox-nvme-snap.pdf].
"Mellanox Adapters Programmer's Reference Manual (PRM)," Mellanox Technologies, 2016, Rev. 0.40, 316 pages.

(Continued)

*Primary Examiner* — Henry Tsai
*Assistant Examiner* — Kim T Huynh
(74) *Attorney, Agent, or Firm* — Sheridan Ross P.C.

(57) ABSTRACT

A computerized system for efficient interaction between a host, the host having a first operating system, and a second operating system, the system comprising a subsystem on the second operating system which extracts data, directly from a buffer which is local to the host, wherein the system is operative for mapping memory from one bus associated with the first operating system to a different bus, associated with the second operating system and from which different bus the memory is accessed, thereby to emulate a connection between the first and second operating systems by cross-bus memory mapping.

19 Claims, 3 Drawing Sheets

(56) References Cited

OTHER PUBLICATIONS

"Mellanox Introduces Revolutionary ConnectX-6 Dx and BlueField-2 Secure Cloud SmartNICs and I/O Processing Unit Solutions," Mellanox Technologies, Aug. 26, 2019, Press Release, 8 pages [retrieved online from: nvidianews.nvidia.com/news/releases-20210113-6829469].
"Mellanox OFED for Linux User Manual," Mellanox Technologies Ltd., 2018, Rev. 4.3, Software version 4.3-1.0.1.0, 281 pages.
"MLNX_OFED Documentation," NVIDIA Corporation, 2020, Rev. 5.0-2.1.8.0, 386 pages.
"MSG_ZEROCOPY," The kernel development community, 2019, 5 pages [retrieved online from: www.kernel.org/doc/html/v4.15/networking/msg_zerocopy.html].
"RoCE in the Data Center," Mellanox Technologies, Oct. 2014, White Paper, Rev. 1.1, 3 pages.
Bigelow "ARM processor," TechTarget, Jan. 16, 2015, 2 pages [retrieved online from: whatis.techtarget.com/definition/ARM-processor].
Corbet "Zero-copy TCP receive," Eklektix, Inc., Apr. 19, 2018, 5 pages [retrieved online from: lwn.net/Articles/752188/].

\* cited by examiner

CROSS BUS MEMORY MAPPING

FIELD OF THE INVENTION

This invention relates generally to hardware storage devices, and more specifically to networked hardware storage devices.

BACKGROUND OF THE INVENTION

Zerocopy within a single operating system is known, e.g. by using the Linux TCP stack.

PCIe (Peripheral Component Interconnect Express), also abbreviated as PCI-e, is an example of a high-speed serial computer expansion bus standard, described inter alia in Wikipedia's entry on PCI_Express.

The following article: lwn.net/Articles/752188, available online, describes a MSG_ZEROCOPY feature added in (Linux Kernel) 4.14 which "enables zero-copy transmission of data", adding that "implementation of zero-copy reception will . . . have to map . . . packet buffers into user-space memory".

BlueField®-2 and ConnectX®-6 are known NVIDIA® products.

BlueField®-2—these are next-generation cloud Smart-NICs and I/O Processing Unit (IPU) solutions, delivering unprecedented data center security, performance and efficiency on a massive scale, for any workload. Continuing Mellanox's innovation in high-performance cloud fabrics, ConnectX®-6 Dx and BlueField®-2 make the impossible possible, by introducing cutting-edge hardware acceleration engines and best-in-class software programmability to mission-critical applications. They deliver new levels of security and efficiency with the highest return on investment (ROI) for hyperscale, enterprise, and telco environments.

ConnectX®-6 Dx SmartNICs provide up to two ports of 25, 50 or 100 Gb/s, or a single port of 200 Gb/s, Ethernet connectivity powered by 50 Gb/s PAM4 SerDes technology and PCIe 4.0 host connectivity. The ConnectX®-6 Dx hardware offload engines include Ipsec and inline TLS data-in-motion cryptography, advanced network virtualization, RDMA over Converged Ethernet (RoCE), and NVMe over Fabrics (NVMe-oF) storage accelerations.

The BlueField®-2 IPU integrates all the advanced capabilities of ConnectX®-6 Dx with an array of powerful ARM processor cores, high performance memory interfaces, and flexible processing capabilities in a single System-on-Chip (SoC).

RDMA for data centers based on an Ethernet or mixed-protocol fabric is described online here: Mellanox.com/sites/default/files/related-docs/whitepapers/roce_in_the_data_center.pdf.

Wikipedia states that "In computing, remote direct memory access (RDMA) is a direct memory access from the memory of one computer into that of another without involving either one's operating system. This permits high-throughput, low-latency networking, which is especially useful in massively parallel computer clusters. RDMA supports zero-copy networking by enabling the network adapter to transfer data from the wire directly to application memory or from application memory directly to the wire, eliminating the need to copy data between application memory and the data buffers in the operating system. Such transfers require no work to be done by CPUs, caches, or context switches, and transfers continue in parallel with other system operations. This reduces latency in message transfer."

However, Wikipedia adds that "this strategy presents several problems related to the fact that the target node is not notified of the completion of the request (single-sided communications)."

Use of networking offloads in data centers is described, inter alia, here: Mellanox.com/files/doc-2020/sb-mellanox-nvme-snap.pdf.

A "socket" typically comprises an endpoint (typically, IP address and port number) of a two-way communication link between first and second programs running on the network. The socket may be bound to a port number which enables the TCP layer to identify the application to which data is to be sent.

NVMe/TCP is an example of a block storage protocol. NVMe is an example protocol, however, references thereto herein are not intended to be limiting, and, more generally, any appropriate local or PCI storage protocol may be employed instead.

Transmission Control Protocol/Internet Protocol (TCP/IP) is an example of a networking protocol which may be used by plural computers to communicate between themselves.

SUMMARY OF THE INVENTION

Certain embodiments seek to reduce storage staging buffer copies.

Certain embodiments seek to provide a single device (e.g. ConnectX® card) exposed to multiple PCIe busses, with software configured to map memory from one PCIe bus to be accessed by a different PCIe bus e.g. using cross-PCIe mapping and/or transaction. A memory key may be used to describe a buffer (memory); the key may be defined to represent cross PCIe (GVMI) mapping e.g. as described herein. However, in a PCIe NTB (Non-Transparent Bridge) embodiment, no memory key need be provided. In contrast, legacy RDMA crosses PCIe boundaries by having a pair of HW devices (ConnectX® cards or others) which define an 'RDMA connection'. Each device can handle only local PCIe buffers, but the RDMA connection can transfer buffers between the devices.

Certain embodiments seek to provide cross bus memory mapping.

More generally, certain embodiments seek to improve TOPS (IO operations per second) and/or reduce latency.

The scope of the invention includes inter alia the following embodiments:

Embodiment 1. A computerized system for efficient interaction between a host, the host having a first operating system, and a second operating system, the system comprising:

a subsystem, e.g. on the second operating system, which extracts data, typically directly from a buffer which is local to the host, wherein the system may be operative for mapping memory from one bus which may be associated with the first operating system to a different bus which may associated with the second operating system and from which different bus, typically, the memory is accessed, thereby to emulate a connection between the first and second operating systems e.g. by cross-bus memory mapping.

Embodiment 2. A system according to any of the preceding embodiments wherein the first operating system has PCI-type connectivity, including plural layers, to the second operating system.

Embodiment 3. A system according to any of the preceding embodiments wherein the subsystem comprises a network stack.

Embodiment 4. A system according to any of the preceding embodiments wherein the network stack is configured to identify a buffer outside of the second operating system's own memory which allows software on the second operating system to access the buffer from the first operating system.

Embodiment 5. A system according to any of the preceding embodiments wherein the buffer, which is local to the host, resides on the host.

Embodiment 6. A system according to any of the preceding embodiments wherein the system also includes an application on the host which:
  opens a storage volume on an emulated NVMe, thereby to provide an opened file;
  allocates a memory block in local memory and writes data aka buffer B into the memory block;
  writes to the opened file thereby to define a write call; and
  provides a kernel driver which handles the write call and prepares an NVMe capsule with the buffer B.

Embodiment 7. A system according to any of the preceding embodiments wherein the system includes NVMe emulation software and a TCP software stack which cooperate to provide cross-bus mapping by allowing a cross device memory key to pass through plural software layers, thereby to allow software on the second operating system to access the host local buffer from the first operating system.

Embodiment 8. A system according to any of the preceding embodiments wherein the first operating system is also configured to control operations, thereby to allow the cross device memory key to pass through the plural software layers, wherein the operations comprise:
  Operation 25. host's NVMe driver C posts a request pointing to buffer B, to an NVMe emulated device D managed via the DPU and NVMe emulated device D exposes an NVMe device (which D emulates) to the host;
  Operation 30. NVMe emulated device D gives notification, to a manager E of NVMe emulated device D, on a DPU, that an NVMe request is ready and Manager E gets a copy of the NVMe request to Manager E's local memory;
  Operation 35. Manager E understands, e.g. by accessing the copy of the NVMe request one Manager E's local memory, that the NVMe request references buffer B which, being part of client host memory, has a different PCIe bus or function;
  Operation 40. manager E starts a new request, on an NVMe-TCP initiator driver F running on the DPU, with attributes to execute this new request and the new request, or attributes thereof, include local request info and contents of buffer (B) which is remote;
  Operation 50. NVMe-TCP initiator driver F holds a connected TCP socket to a target via a TCP user-space stack, G, on the DPU;
  Operation 53. NVMe-TCP initiator driver F passes, to VMA TCP user-space stack G, the NVMe-TCP formatted headers of the request in the DPU local memory and the headers pass from F to G via a BSD send API;
  Operation 57. NVMe-TCP initiator driver F passes, to VMA TCP user-space stack G, contents of buffer B and buffer B's contents pass from G to G via extended send API;
  Operation 60. TCP user-space stack G manages the TCP stack and the HW send queue to send the DPU memory stream portion, and the host memory stream portion, without copying buffer B, or the memory stream portion/s, to local PCIe function bus;
  Operation 70. NVMe-TCP initiator driver F gets a NVMe-TCP response from the target about the NVMe-TCP request which was sent;
  Operation 75. responsively, NVMe-TCP initiator driver F releases buffer B as the relevant TCP stream portion in TCP user-space stack G that was ACKed.

Embodiment 9. A system according to any of the preceding embodiments wherein the memory key comprises an RDMA key.

Embodiment 10. A system according to any of the preceding embodiments wherein the memory key comprises a DMA key.

Embodiment 11. A method for efficient interaction between a host and a remote target, the method comprising:
  providing a host having a first operating system and a remote target having a second operating system which has PCI-type connectivity with the first operating system; and
  sharing at least one buffer, residing on the host, with the remote target, including providing zero copy access, for the target, to the at least one buffer, thereby to provide double-zero copy across plural operating systems.

Embodiment 12. A method according to any of the preceding embodiments wherein at least one of the host and target use Non-Transparent Bridge (NTB) for inter-domain communication through PCIe interfaces.

Embodiment 13. A method according to any of the preceding embodiments wherein an I/O Processing Unit (IPU) including an array of ARM processor cores is deployed between the host and the network, and wherein SNAP TCP Storage on the ARM processor cores zero copies PCIe access from the Host using at least one XGVMI memory key.

Embodiment 14. A method according to any of the preceding embodiments and wherein a first copy operation occurs from the host to the IPU, and a second copy occurs from CPU memory to a TCP stack.

Embodiment 15. A method according to any of the preceding embodiments and wherein the method includes the following operations, thereby to increase IPOS and/or to reduce latency and/or to reduce CPU utilization, by reducing storage staging buffer copies:
  Operation 10. an application on a client host prepares a remote data buffer B on the host's local memory;
  Operation 15. the host application requests an NVMe driver C on the client host to write remote buffer B to a storage volume;
  Operation 20. the NVMe driver C on the client host prepares an NVMe request which points to buffer B;
  Operation 25. the host's NVMe driver C posts the request pointing to buffer B, to an NVMe emulated device D managed via the DPU, and NVMe emulated device D exposes an NVMe device, which NVMe emulated device D emulates, to the client host;
  Operation 30. NVMe emulated device D gives notification, to a manager E of NVMe emulated device D, on a DPU, that an NVMe request is ready, and Manager E gets a copy of the NVMe request to Manager E's local memory;
  Operation 35. Manager E understands, that the NVMe request references buffer B, which is part of the client host memory, hence has a different PCIe bus or function;
  Operation 40. manager E starts a new request, on an NVMe-TCP initiator driver F running on the DPU, with attributes to execute this new request, and the new request, or attributes thereof, include local request info and contents of the remote data buffer B;

Operation 50. NVMe-TCP initiator driver F holds a connected TCP socket to a target via a VMA TCP user-space stack G, on the DPU;

Operation 53. NVMe-TCP initiator driver F passes, to VMA TCP user-space stack G, the NVMe-TCP formatted headers of the request in the DPU local memory and the headers may pass from NVMe-TCP initiator driver F to VMA TCP user-space stack G via a BSD send( ) API;

Operation 57. NVMe-TCP initiator driver F passes, to VMA TCP user-space stack G, contents of buffer B and buffer B's contents pass from NVMe-TCP initiator driver F to VMA TCP user-space stack G via extended send API;

Operation 60. TCP user-space stack G manages the TCP stack and the HW send queue to send the DPU memory stream portion, and the host memory stream portion, without copying buffer B, or the memory stream portion/s, to a local PCIe function bus;

Operation 70. NVMe-TCP initiator driver F gets a NVMe-TCP response from the target about the NVMe-TCP request which was sent; and Operation 75. responsively, NVMe-TCP initiator driver F releases buffer B as the relevant TCP stream portion in VMA TCP user-space stack G was ACKed.

Embodiment 16. A method according to any of the preceding embodiments wherein the IPU comprises a VMA, and wherein the network stack identifies a buffer storing data which is to be sent over the network, using a memory key in addition to a pointer.

Embodiment 17. A method according to any of the preceding embodiments wherein the network stack extracts data to be sent over the network, directly from the buffer residing on the host which is in a different PCIe domain.

Embodiment 18. A method according to any of the preceding embodiments wherein the remote target is networked to the host via a network of which the host is unaware.

Embodiment 19. A system according to any of the preceding embodiments wherein an NTB (Non-Transparent Bridge) is used to allow software on the second operating system to access the host local buffer from the first operating system.

Embodiment 20. A system according to any of the preceding embodiments wherein the NTB (Non-Transparent Bridge) is used by a VMA on the second operating system.

Embodiment 21. A system according to any of the preceding embodiments wherein the network stack is configured to identify the buffer using a memory key rather than a pointer.

Embodiment 22. A system according to any of the preceding embodiments wherein an NVMe-TCP initiator driver passes the buffer's contents to a TCP user-space stack in the network stack.

Embodiment 23. A system according to any of the preceding embodiments wherein the second operating system includes plural ARM CPUs.

Embodiment 24. A system according to any of the preceding embodiments wherein ARM based NVMe-TCP emulation software passes the buffer to a TCP socket in the VMA.

Embodiment 25. A system according to any of the preceding embodiments and wherein the second operating system extracts data to be sent over the network, directly from a buffer residing on the host which is in a different PCIe domain.

Embodiment 26. A system according to any of the preceding embodiments wherein the network stack comprises a VMA.

DETAILED DESCRIPTION OF EMBODIMENTS

The term "memory key" (Mkey) as used herein, is intended to include a context that has a pointer, and also has additional attributes, e.g. of the pointer, that describe at least one of the following: how to access the memory pointer (e.g. read, write, atomic, all), which entity or entities can access the pointer (e.g. protection keys), what translations may to be done to provide virtual to physical mapping, and cross-GVMI information, e.g. as described herein.

It is appreciated that pointers are known in the art of computer programming, e.g. as described in Wikipedia's entry on "Pointer_(computer_programming)", and CPU's (and other peripheral devices) can handle data if they are in registers or pointed to, by a pointer, in the memory space. Memory keys are described, for example, in Mellanox.com/related-docs/prod_software/Mellanox_OFED_Linux_User_Manual_v4_3.pdf.

Mkeys and their creation are described for example, in 8 ellanox.com/related-docs/user_manuals/Ethernet_Adapters_Programming_Manual.pdf. for example, the CREATE_MKEY command described in that manual generates new Mkeys. The context of the new Mkey object may be taken from an input mailbox. Typically, hardware provides an Mkey index as an output parameter. This index may be used by software as a handle when accessing this object.

VHCA is a Virtual Host Channel Adapter. VHCAs and VHCA IDs are described inter alia in co-owned U.S. Pat. No. 9,397,960B2, the disclosure of which is hereby incorporated by reference. Multiple context single logic virtual host channel adapters are described in this Cisco patent: https://patents.google.com/patent/US20080123672, the disclosure of which is hereby incorporated by reference. Having plural virtual functions (VFs), each of which presents itself as an independent VHCA to a host, while only a single HCA is observable by the network which is unaware of the VHCAs, is known. Methods for sharing the same physical port(s) among multiple VHCAs are known and are described for example in download.lenovo.com/servers/mig/2020/05/28/21936/mlnx-lnvgy_dd_nic_cx.ib-5.0-2.1.8.0-0_rhel7_x86-64.pdf on page 284.

The term "GVMI" aka Guest Virtual Machine Identifier (GVMI) typically denotes a hardware structure; the GVMI is typically the name of a guest operating system, for a virtual machine. An example GVMI is a vhca_id_aka "VHCA ID" or VHCA identifier.

The term "cross GMVI Mkey" refers to a hardware structure which exists, for example, in Connect®X6Dx, which is described in the following www link: nvidia.com/en-us/networking/ethernet/Mellano-6-dx. The terms XGVMI, cross GVMI and cross-domain GVMI are used herein generally interchangeably. It is appreciated that network adaptors, like the Connect®X6Dx, have HW parts which support a cross GVMI Mkey, operating in conjunction with firmware running on the internal cores. This firmware typically exposes a protected command interface documented by the Programmer's Reference Manual aka PRM available here: Mellanox.com/related-docs/user_manuals/Ethernet_Adapters_Programming_Manual.pdf.

It is appreciated, however, that any suitable Ethernet network adapter driver may be used, which supports a cross GVMI Mkey as described. This firmware's code may take a command and map that command into HW configurations. This is but an example implementation, which provides flexibility in terms of keeping the command identical, even when a new hardware version comes out. In device APIs implemented by the above firmware, this may be exposed as: "CREATE_MKEY with access_mode=0x6: CROSSING_VHCA_MKEY"

Figure 1:
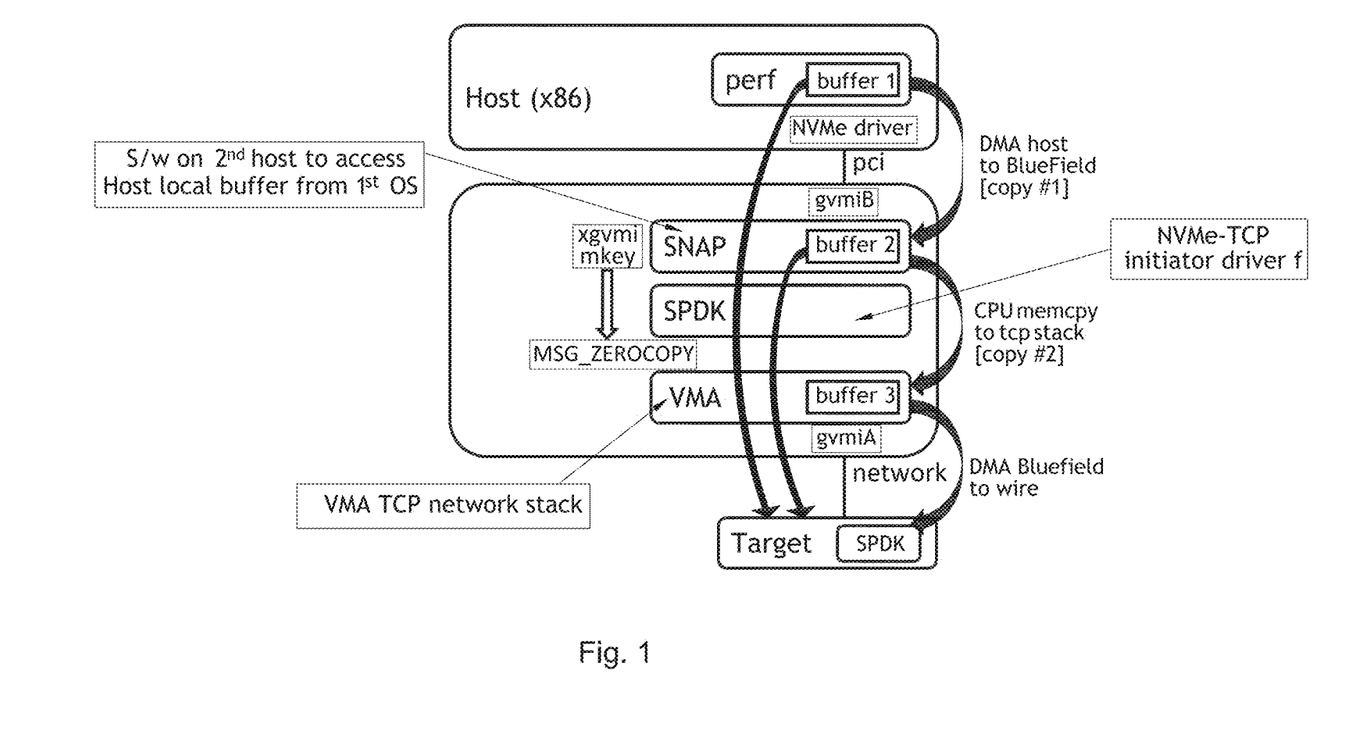
FIG. 1 is a simplified block diagram illustration of a system for cross bus memory mapping provided in accordance with an embodiment of the invention.
Figure 2:
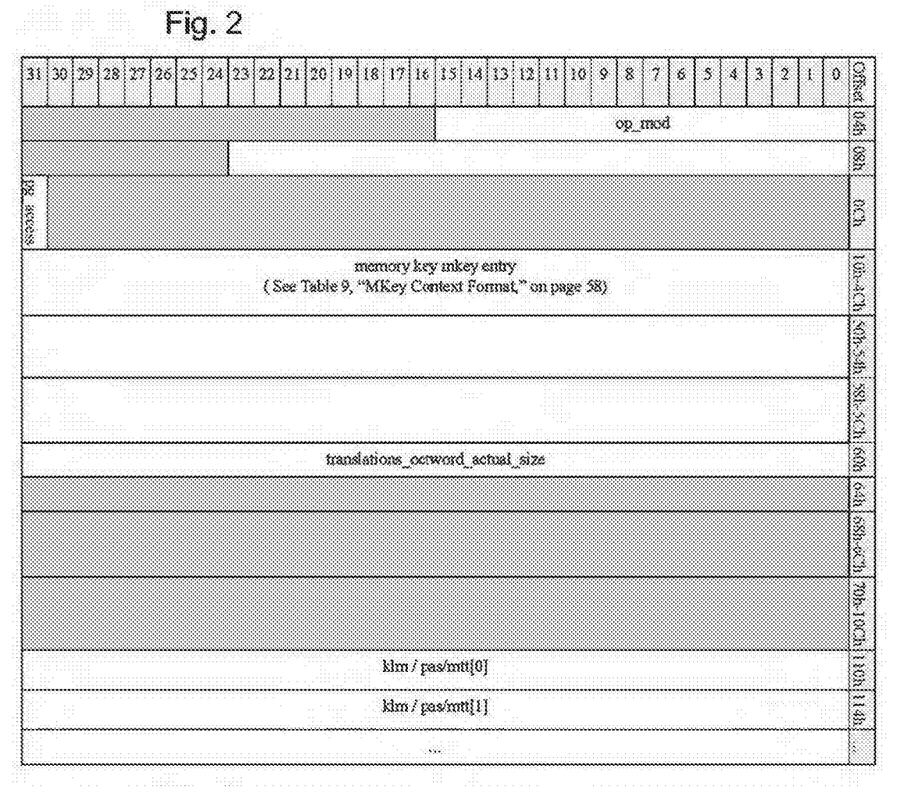
FIGS. 2-5 are tables which may be used to create memory keys.
Figure 3:
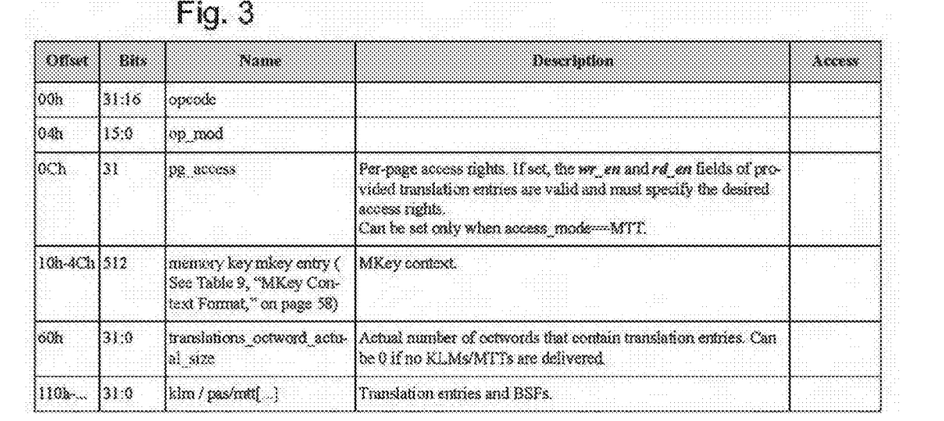
Figure 4:
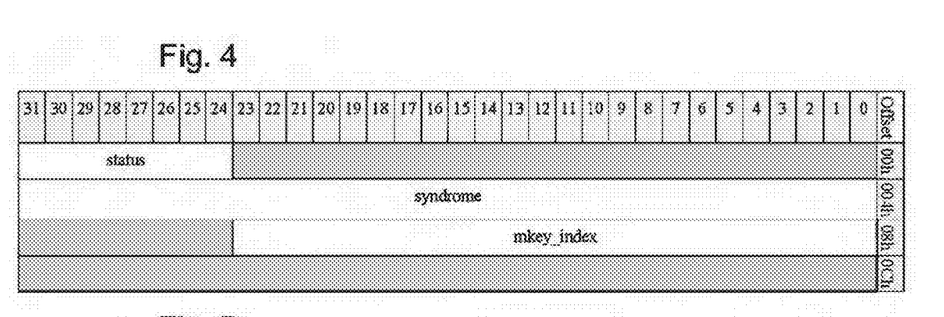

FIG. 1 illustrates a system for cross bus memory mapping which typically facilitates storage NVMe emulation over NVMe-TCP acceleration according to an embodiment of the invention. The system of FIG. 1 typically includes all or any appropriate subset of the following:
- a client application, aka "performance application" or perf, on a host, aka client host. It is appreciated that software residing on the host operating system in FIG. 1, typically controls the operations 10-75 described hereinbelow;
- a DPU (BlueField® for example)
- an NVMe driver on the client host (aka host's NVMe driver C);
- NVMe-TCP initiator driver F running on the DPU;
- VMA TCP user-space stack, G, on the DPU;
- a VHCA;
- GVMIs A and B, typically implemented in hardware, either or both of which may be replaced by VHCA's; typically, GVMI A is defined as a network device. Typically, GVMI B comprises an NVMe emulated (PCIe, e.g.) device which exposes an NVMe device to the client host, and is managed via the DPU;
- software on the second operating system (e.g. Blue-Field®) to access host local buffer from the first operating system;
- TCP socket in the VMA; and
- NVMe-TCP emulation software which passes a buffer B to VMA TCP socket which may be implemented on or as SNAP®.

A cross-GVMI memory key aka cross-GVMI-Mkey is configured to take a buffer from one GVMI e.g. GVMI A, and use that same buffer on the other side with the 2nd GVMI e.g. GVMI B.

A DPU is one possible example of a data processor, typically a system on a chip, aka SoC, which typically includes:
- a software-programmable, multi-core CPU, which may have ARM architecture, typically coupled to other SoC components, and/or
- a high-performance network interface for parsing, processing and transferring data e.g. to GPUs and/or CPUs, at the speed of the rest of the network (aka line rate); and/or
- programmable acceleration engines that offload, thereby to improve performance of, applications for, say, AI and/or machine learning and/or security and/or telecommunications and/or storage.

It is appreciated that certain embodiments herein are advantageous in reduction of latency and CPU usage incurred from copy overhead of the NVMe payload from Host (e.g. X86) memory to a TCP packet payload managed from the DPU CPU cores NVMe emulation software (e.g. SNAP®).

Typically, the NVMe emulation software (e.g. SNAP®) configures the network interface card (NIC) hardware to send at least one NVMe-TCP packet, such that the TCP header is gathered from the local DPU memory, whereas the TCP payload is gathered directly from the host (X86) memory on a remote PCIe bus. Thus, up to two skipping copy and staging buffers are obviated or skipped.

A particular advantage of certain embodiments is that the network interface card (NIC) hardware typically gathers a single packet from plural memory addresses spread across plural PCIe buses. Software is used to translate and/or map and/or manage these memory addresses from their respective PCIe buses, and the hardware is configured accordingly, to send such packets.

The BlueField®-2 I/O Processing Unit (IPU) is a System-on-Chip (SoC) which includes a SmartNIC e.g. ConnectX®-6 Dx, an array of ARM processor cores, high performance memory interfaces, and flexible processing capabilities. The SmartNIC may include hardware offload engines having IPsec and inline TLS data-in-motion cryptography, and/or network virtualization, and/or RDMA over Converged Ethernet (RoCE), and/or NVMe over Fabrics (NVMe-oF) storage accelerations, e.g. as described online in: mellanox.com/news/press_release/mellanox-introduces-revolutionary-connectx-6-dx-and-bluefield-2-secure-cloud-smartnics-and-io. An ARM processor is a CPU based on Advanced RISC Machines (ARM)'s RISC (reduced instruction set computer) architecture e.g. as described online in: whatis.techtarget.com/definition/ARM-processor#:~:text=An%20ARM%20processor%20is%20one, bit%20RISC%20multi%2Dcore %20processors.

The system of FIG. 1 may be used in conjunction with known technologies such as SNAP® and/or VMA and/or TCP sockets and/or libibverbs, and/or BlueField® for example, but these are not intended to be limiting. For example, the second operating system in FIG. 1 may include plural ARM CPUs as described herein, an array of ARM processor cores (such as an NVIDIA® BlueField® IPU aka BlueField® (ARM)), or, alternatively, may not be ARM based at all, and may instead may, say, be X86 or may be based on any other suitable CPU architecture.Mellanox NVMe SNAP® (Software-defined Network Accelerated Processing) is an example of a framework or technology which enables hardware-accelerated virtualization of NVMe storage e.g. by emulating a block storage device to a host. For example, an NVMe drive on a PCIe bus may be emulated, thereby making networked storage look like a local NVMe SSD. A host OS/Hypervisor may make use of its standard NVMe driver, which is unaware that the communication is terminated by the NVMe SNAP® rather than by a physical drive. Logic may then be applied to the data via the NVMe SNAP® and transmitted over the network to a storage target, e.g. on an Ethernet or InfiniBand protocol. Alternatively, any other suitable technology which implements in-hardware storage virtualization, and/or enables optimization of storage resources for CAPEX and OPEX savings, and/or is configured to free up computer node CPU resources by offloading both networking and storage data paths, and preferably enables integration into any storage solution based on any network protocol, may be employed.

Regarding [copy #2], it is appreciated that this online link: kernel.org/doc/html/v4.15/networking/msg_zerocopy.html provides a Linux socket definition of the Zerocopy flags. The TCP stack implementation (VMA) may add support for sends with MSG_ZEROCOPY flag. The implementation of the send( ) call with the MSG_ZEROCOPY flag may use the application buffer pointer as a reference, without copying it into an intermediate buffer. The TCP stack may manage the reference buffer pointer for the sending of the TCP packet, and may only release the reference on the buffer once a TCP ACK is received covering the entire send buffer size. The TCP socket owner (SPDK initiator) may call send with MSG_ZEROCOPY when supported by the TCP stack implementation (VMA). The implementation of the caller of the send( ) with the MSG_ZEROCOPY may place the sent buffer aside until an indication is received that the TCP stack completed the send, and received an acknowledgement.

Re [copy #1] which may comprise a Zerocopy SNAP® (e.g. host→BlueField®), an API may be added to the TCP stack (e.g. VMA) to provide the cross GVMI Mkey, so that VMA can later detect a marked physical address (aka "PA") as host memory, and may use this cross-domain GMVI memory key for the PCIe gathered in HW. SNAP® preparing cross GVMI Mkey may pass the cross GVMI Mkey to VMA in TCP socket initialization. Signaling the TCP buffer as "external host memory" which may require the cross GVMI Mkey between SNAP® and (say) VMA, may be done by suitably marking the external host buffer pointer. For example, the MSB of the physical address may be set accordingly. Logic may be added in (say) VMA to detect marked PA as host external memory buffer, and may use the cross GMVI VMA to set the Mkey) to the hardware with data buffer SGE on raw QP (SQ/TIS) with the cross GVMI Mkey.

For simplicity, this specification refers to SNAP™ by way of example. However, such references are not intended to be limiting, and, more generally, any storage device emulator (e.g. a smartNIC service) which emulates an NVMe (or virtio-blk) storage PCIe device to the host by exposing a storage PCIe device interface to a host (or enabling access by the host to the storage PCIe device) may be employed.

The following method of operation is provided, either standalone or in conjunction with the system of FIG. 1, or more generally with all or any subset of the following:

A. an application on a client host (aka host application A)
B. a data buffer on client host memory (aka buffer B)
C. an NVMe driver on the client host (aka host's NVMe driver C)
D. an NVMe emulated device (exposes NVMe device to client host, and managed via the DPU)
E. NVMe emulated device manager on DPU e.g. SNAP®
F. NVMe-TCP initiator driver F running on, say, the DPU
G. a VMA (say) TCP user-space stack, G, which may be on the DPU.

The method typically includes all or any subset of the following operations, suitably ordered, e.g. as follows:

Operation 10. An application on a client host prepares a remote data buffer B on the host's local memory;
Operation 15. the host application requests an NVMe driver C on the client host to write remote buffer B to a storage volume;
Operation 20. host's NVMe driver C prepares an NVMe request which points to buffer B;
Operation 25. host's NVMe driver C posts the request pointing to buffer B, to an NVMe emulated device D managed via the DPU, and NVMe emulated device D exposes an NVMe device, which NVMe emulated device D emulates, to the client host;
Operation 30. NVMe emulated device D gives notification, to a manager E of NVMe emulated device D, on a DPU, that an NVMe request is ready, and Manager E gets a copy of the NVMe request to Manager E's local memory;
Operation 35. Manager E understands, e.g. by accessing the copy of the NVMe request one Manager E's local memory, that the NVMe request references buffer B, which is part of the client host memory, hence has a different PCIe bus or function;
Operation 40. manager E starts a new request, on an NVMe-TCP initiator driver F running on the DPU, with attributes to execute this new request, and the new request, or attributes thereof, include local request info and contents of the remote data buffer B;
Operation 50. NVMe-TCP initiator driver F holds a connected TCP socket to a target via a VMA (say) TCP user-space stack G, on the DPU;
Operation 53. NVMe-TCP initiator driver F passes, to VMA TCP user-space stack G, the NVMe-TCP formatted headers of the request in the DPU local memory, and the headers may pass from NVMe-TCP initiator driver F to VMA TCP user-space stack G via a BSD send( ) API;
Operation 57. NVMe-TCP initiator driver F passes, to VMA TCP user-space stack G, contents of buffer B. Buffer B's contents may pass from NVMe-TCP initiator driver F to VMA TCP user-space stack G via extended send API; thus the VMA becomes able to ID (identify) the buffer, using a memory key rather than a pointer.
Operation 60. VMA TCP user-space stack G manages the TCP stack and the HW send queue to send the DPU memory stream portion, and the host memory stream portion, without copying buffer B, or the memory stream portion/s, to a local PCIe function bus;
Operation 70. NVMe-TCP initiator driver F gets a NVMe-TCP response from the target about the NVMe-TCP request which was sent; and
Operation 75. responsively, NVMe-TCP initiator driver F releases buffer B as the relevant TCP stream portion in VMA TCP user-space stack G that was ACKed.

Many variations are possible, relative to the specific embodiments described herein merely by way of example. To give just a few examples:

The system and methods herein may be incorporated into any suitable system such as, for example, SNAP, NVIDIA Mellanox Rivermax® or VMA. Yet, it is appreciated that use of VMA is but one possible embodiment. VMA is one possible TCP/IP stack solution, but, alternatively, in a non-VMA solution, a TCP/IP stack may be provided which is modified e.g. as described herein, to handle the cross GVMI Mkey. It is appreciated that VMA (or Mellanox Messaging Accelerator) is an example of a network stack; other examples include but are not limited to Linux TCP stack, mTCP, Seastar, and other network stacks described online, e.g. on DPDK's ecosystem page which is available online at the following link: dpdk.org/ecosystem/.

Also, this invention is not specific to PCI-type connectivity (e.g. to PCI or PCIe connectivity specifically), and may be extended to busses other than PCI and PCIe.

Figure 5:
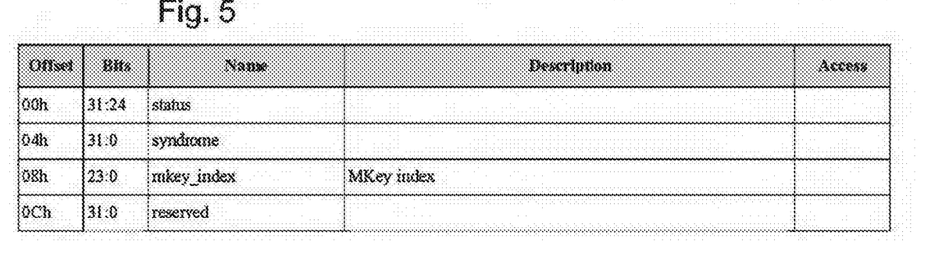

Also, any suitable method may be employed to create memory keys. For example, FIGS. 2, 3, 4, 5 represent tables 226-229 in mellanox.com/related-docs/user_manuals/Ethernet_Adapters_Programming_Manual.pdf. These respectively represent an example CREATE_MKEY input structure layout (FIG. 2), example CREATE_MKEY input structure field descriptions (FIG. 3), example CREATE_MKEY output structure layout (FIG. 4) and example CREATE_MKEY output structure field descriptions (FIG. 5).

Also, an NTB (Non-Transparent Bridge)-based method may replace the use of a cross-domain GVMI memory key aka "cross GVMI Mkey" as described herein, e.g. by providing software which is configured to allow VMA to use NTB to (as in the cross GVMI Mkey solution), allowing software on the second operating system (e.g. BlueField®) to access the host local buffer from the first operating system.

Also, as described, according to certain embodiments, the VMA extracts data to be sent over the network, directly from the buffer residing on the host which is in a different PCI or PCIe domain. Any suitable implementation may be employed to cause the VMA to do this. For a storage related solution, the application on the host may perform all or any suitable subset of the following:

Stage a. Open the storage volume (e.g.: open("path")) on the emulated NVMe; and/or Stage b. Allocate local memory (e.g.: malloc( ) and write its data into the allocated memory block [e.g. as described herein with reference to Operation 10] and/or Stage c. Write( ) to the opened file [e.g. as described herein with reference to Operation 15]; and/or Stage d. A kernel driver may handle the write( ) call and may prepare a NVMe capsule with buffer B, typically from stage b, e.g. as described herein with reference to Operation 20.

The term non-transparent, as used herein, is in contradistinction to connectivity, which is "transparent". For example, a PCIe NTB (Non-Transparent Bridge) may be used to provide connectivity between plural CPUs, GPUs and FPGAs. When a PCIe (transparent) Bridge is used, all PCIe busses, all the way to all the Endpoints, are visible to a given Root Complex. In contrast, a bridge which is non-transparent forwards PCIe traffic between separate PCIe busses and each root complex, RC, sees the NTB (Non-Transparent Bridge) as an Endpoint device, whereas the root complex and devices on the other side of the bridge are not visible to RC, e.g. as described at the following online location: missinglinkelectronics.com/devzone/index.php/fpga-debug-ntb.

VMA (Voltaire Messaging Accelerator) is an example data acceleration technology. NVIDIA's VMA, released as Open Source, boosts performance of message-based and streaming applications across a wide range of industries such as, for example, High-Frequency Trading (HFT) platforms and Web 2.0 clusters. VMA exposes standard socket APIs with kernel-bypass architecture, enabling user-space networking for Multicast, UDP unicast, and TCP streaming. VMA can be used out-of-the-box, e.g. due to built-in pre-configured profiles for, say, latency and streaming. VMA is described at the following online locations: docs.mellanox.com/category/vma and docs.mellanox.com/display/VMAv911/Introduction+to+VMA; it is appreciated that other acceleration technologies may include but a subset of the characteristics, properties and functionalities that VMA provides.

The disclosures of all publications and patent documents mentioned in the specification, and of the publications and patent documents cited therein directly or indirectly, are hereby incorporated by reference, other than subject matter disclaimers or disavowals.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example: as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather, the scope of the invention is defined by the appended claims and equivalents thereof.

The invention claimed is:

1. A computerized system for efficient interaction between a host, the host having a first operating system, and a second operating system, the system comprising:

a subsystem on the second operating system which extracts data directly from a buffer which is local to the host, wherein the system is operative for mapping memory from one bus associated with the first operating system to a different bus, associated with the second operating system and from which different bus the memory is accessed, thereby to emulate a connection between the first and second operating systems by cross-bus memory mapping to reduce a number of copy operations in a memory transaction involving the memory, wherein the subsystem includes NVMe emulation software and a TCP software stack which cooperate to provide the cross-bus mapping by allowing a cross device memory key that identifies the buffer to pass through plural software layers, thereby to allow software on the second operating system to access the buffer.

2. A system according to claim 1, wherein the first operating system has PCI-type connectivity, including plural layers, to the second operating system.

3. A system according to claim 1, wherein the buffer, which is local to the host, resides on the host.

4. A system according to claim 1, further comprising an application on the host which:

opens a storage volume on an emulated NVMe, thereby to provide an opened file;

allocates a memory block in local memory and writes data of the buffer into the memory block;

writes to the opened file thereby to define a write call; and provides a kernel driver which handles the write call and prepares an NVMe capsule with said buffer.

5. A system according to claim 1, wherein the first operating system is also configured to control operations, thereby to allow the cross device memory key to pass through the plural software layers, wherein said operations comprise:

posting, by the host's NVMe driver, a request pointing to the buffer to an NVMe emulated device managed via a DPU, and exposing, by the NVMe emulated device, an NVMe device to the host;

providing a notification, by the NVMe emulated device to a manager of the NVMe emulated device on the DPU, that an NVMe request is ready, and obtaining, by the manager of the NVMe emulated device, a copy of the NVMe request on local memory of the manager of the NVMe emulated device;

accessing, by the manager of the NVMe emulated device, the copy of the NVMe request on the local memory to determine that the NVMe request references the buffer which has a different PCIe bus or function;

starting, by the manager of the NVMe emulated device, a new request on an NVMe-TCP initiator driver running on the DPU, with attributes to execute this new request, wherein the new request, or attributes thereof, include local request info and contents of the buffer which is remote;

holding, by the NVMe-TCP initiator driver, a connected TCP socket to a target via a TCP user-space stack on the DPU;

passing, by the NVMe-TCP initiator driver to the TCP user-space stack, NVMe-TCP formatted headers of the new request in the local memory via a BSD send API;

passing, by the NVMe-TCP initiator driver to the TCP user-space stack, contents of the buffer via an extended send API;

managing, by the TCP user-space stack, the TCP user-space stack and a send queue to send a DPU memory stream portion, and a host memory stream portion, without copying the buffer and the memory stream portions to a local PCIe function bus;

obtaining, by the NVMe-TCP initiator driver, a NVMe-TCP response from the target about the new request which was sent; and responsively, releasing, by the NVMe-TCP initiator driver, the buffer as the relevant TCP stream portion in the TCP user-space stack.

6. A system according to claim 1, wherein the cross device memory key comprises an RDMA key.

7. A system according to claim 1, wherein the cross device memory key comprises a DMA key.

8. A method for efficient interaction between a host and a remote target, the method comprising:

providing a host having a first operating system and a remote target having a second operating system which has PCI-type connectivity with the first operating system; and sharing at least one buffer, residing on the host, with the remote target, including providing zero copy access for the remote target to said at least one buffer, thereby to provide double-zero copy across the first and second operating systems to reduce a number of copy operations for a memory transaction between the host and the remote target, wherein an I/O Processing Unit (IPU) including an array of ARM processor cores is deployed between the host and the remote target, and wherein storage on the ARM processor cores zero copies PCIe access from the host using at least one memory key that identifies the at least one buffer.

9. A method according to claim 8, wherein at least one of the host and the remote target use Non-Transparent Bridge (NTB) for inter-domain communication through PCIe interfaces.

10. A method according to claim 8, and wherein a first copy operation occurs from the host to the IPU, and a second copy occurs from CPU memory of the IPU to a TCP stack.

11. A method according to claim 10, wherein the method includes the following operations, thereby to increase IPOS and/or to reduce latency and/or to reduce CPU utilization, by reducing storage staging buffer copies:

posting, by the host's NVMe driver, a request pointing to the buffer to an NVMe emulated device managed via a DPU, and exposing, by the NVMe emulated device, an NVMe device to the host;

providing a notification, by the NVMe emulated device to a manager of the NVMe emulated device on the DPU, that an NVMe request is ready, and obtaining, by the manager of the NVMe emulated device, a copy of the NVMe request on local memory of the manager of the NVMe emulated device;

accessing, by the manager of the NVMe emulated device, the copy of the NVMe request on the local memory to determine that the NVMe request references the buffer which has a different PCIe bus or function;

starting, by the manager of the NVMe emulated device, a new request on an NVMe-TCP initiator driver running on the DPU, with attributes to execute this new request, wherein the new request, or attributes thereof, include local request info and contents of the buffer which is remote;

holding, by the NVMe-TCP initiator driver, a connected TCP socket to the remote target via a TCP user-space stack on the DPU;

passing, by the NVMe-TCP initiator driver to the TCP user-space stack, NVMe-TCP formatted headers of the new request in the local memory via a BSD send API;

passing, by the NVMe-TCP initiator driver to the TCP user-space stack, contents of the buffer via an extended send API;

managing, by the TCP user-space stack, the TCP user-space stack and a send queue to send a DPU memory stream portion, and a host memory stream portion, without copying the buffer and the memory stream portions to a local PCIe function bus;

obtaining, by the NVMe-TCP initiator driver, a NVMe-TCP response from the remote target about the new request which was sent; and responsively, releasing, by the NVMe-TCP initiator driver, the buffer as the relevant TCP stream portion in the TCP user-space stack.

12. A method according to claim 8, wherein the IPU identifies the buffer further using a pointer.

13. A method according to claim 12, wherein the IPU extracts data directly from the buffer residing on the host which is in a different PCIe domain.

14. A method according to claim 8, wherein the remote target is networked to the host via a network of which the host is unaware.

15. A system according to claim 1, wherein an NTB (Non-Transparent Bridge) is used to allow software on the second operating system to access the buffer from the first operating system.

16. A system according to claim 1, wherein an NVMe-TCP initiator driver passes the buffer's contents to a TCP user-space stack in the TCP stack.

17. A system according to claim 16, wherein said second operating system includes plural ARM CPUs.

18. A system according to claim 17, wherein the NVMe-TCP emulation software is ARM-based and passes the buffer to a TCP socket.

19. A system according to claim 2, wherein the host is in a different PCIe domain.

* * * * *